United States Patent [19]

Skyinskus

[11] 4,410,135
[45] Oct. 18, 1983

[54] CONTROLLER FOR A ROOM HEATING SYSTEM

[76] Inventor: Robert L. Skyinskus, R.D. 5, P.O. Box 873, Newton, N.J. 07860

[21] Appl. No.: 203,862

[22] Filed: Nov. 4, 1980

[51] Int. Cl.³ .............................................. F24D 1/00
[52] U.S. Cl. ..................................... 237/8 R; 431/86; 237/19; 236/46 R
[58] Field of Search ............... 237/7, 8 R, 19; 165/20; 236/46 R; 431/86

[56] References Cited

U.S. PATENT DOCUMENTS

| 1,369,702 | 2/1921 | Oca-Balda | 237/7 X |
| 2,434,575 | 1/1948 | Marshall | 237/7 X |
| 3,404,674 | 10/1968 | Albert | 237/7 X |

FOREIGN PATENT DOCUMENTS

| 2739318 | 3/1979 | Fed. Rep. of Germany | 431/86 |
| 1208559 | 10/1970 | United Kingdom | 237/7 |

OTHER PUBLICATIONS

American Stablis Inc., Enertrol Service Manual, Jan. 1979, pp. 1-5.

Primary Examiner—Albert J. Makay
Assistant Examiner—Henry Bennett

[57] ABSTRACT

A controller for a space heating system employs a room thermostat and a furnace thermostat responsive to the temperature of a room and a furnace, respectively, for firing the furnace. This controller has a power input terminal for receiving primary electrical power. The controller also has a timed switch and a switching means. The timed switch can connect and disconnect the power input terminal to the furnace. Disconnecting this terminal disables the furnace thermostat. The switching means responds to the room thermostat and can connect and disconnect the power input terminal to the furnace.

7 Claims, 3 Drawing Figures

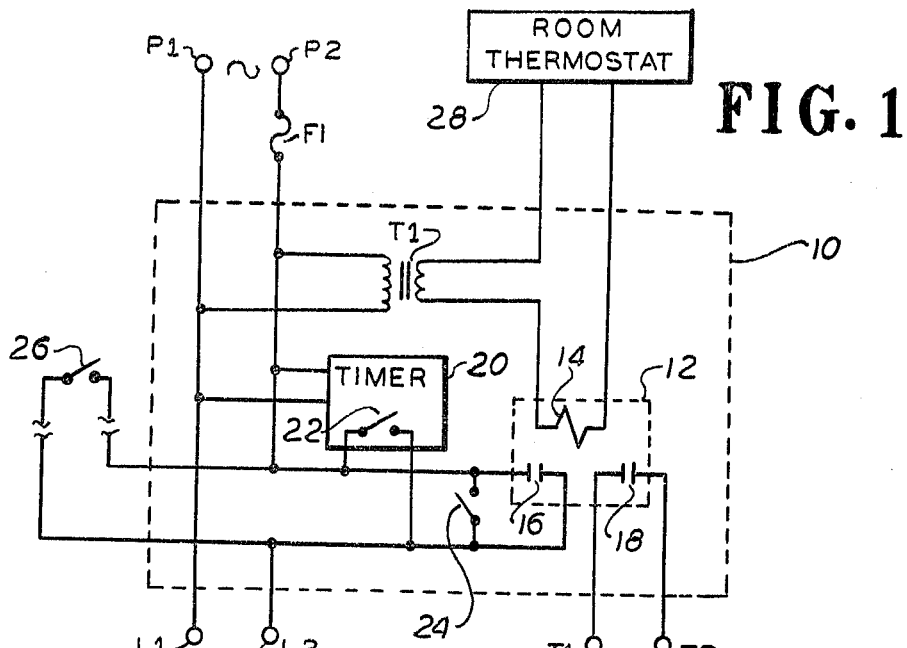
FIG. 1
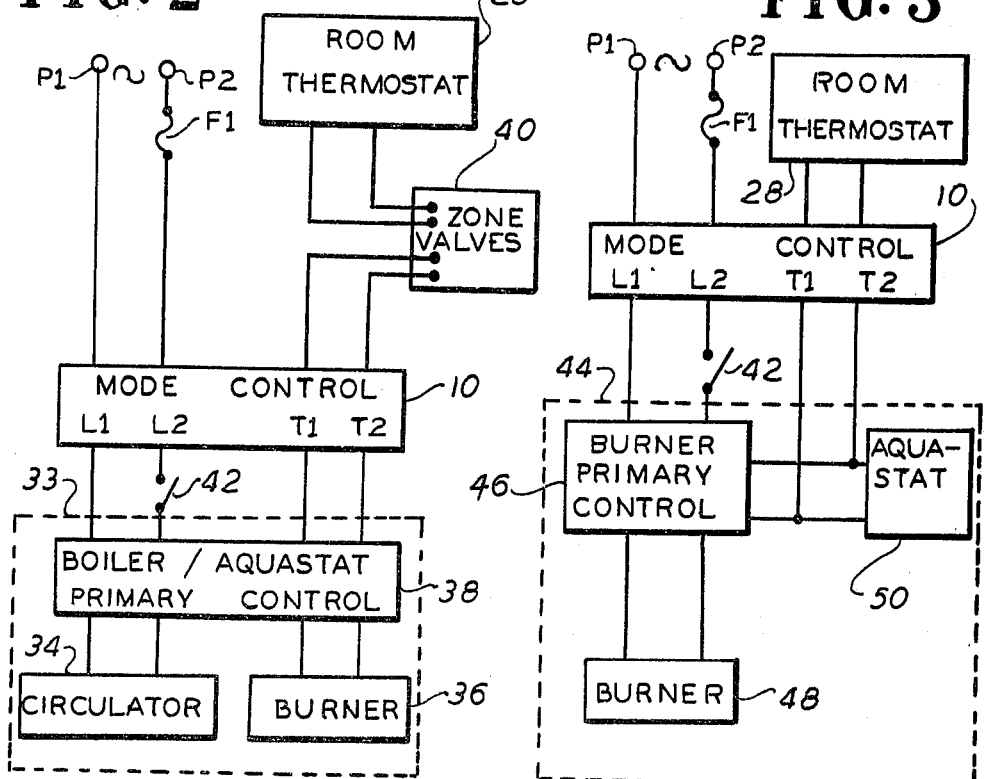
FIG. 2
FIG. 3

CONTROLLER FOR A ROOM HEATING SYSTEM

BACKGROUND OF THE INVENTION

The present invention relates to heating systems and, in particular, to timers for disabling that portion of a furnace which fires it for the purpose of providing potable hot water.

A known furnace employs an aquastat to keep the internal furnace temperature above a preset minimum. This aquastat, a thermostatic device, assures that the furnace is sufficiently warm to heat potable water through an associated heat exchanger. This known furnace also employs a room thermostat to fire the furnace and provide space heating. A disadvantage with this kind of furnace control is that the furnace cycles regularly solely to keep its internal temperature sufficiently high to operate the heat exchanger even when there is no demand by an occupant for potable hot water. For example, the aquastat subsystem may periodically fire the furnace during sleeping hours or other intervals when there is no need for domestic hot water.

A known furnace control reduces the internal furnace temperature when the outside temperature is high. This feature can be disabled by a timer when hot water is needed. However, this system will always cycle the furnace to maintain some elevated internal temperature. Also, these systems for modulating boiler temperature are relatively complex, requiring significant modification of the existing furnace controls.

It is known to provide a timed thermostat to reduce the demand for heat from a furnace and simultaneously disable a separate hot water heater during prescheduled time internals. However, this type of system does not teach how to control a dual function furnace employing an internal aquastat subsystem. The appropriate technique for disabling the foregoing furnace aquastat without eliminating the space heating provided by the furnace has not been developed.

Thus there is a need for simple equipment to reduce fuel consumption in a furnace and still obtain from it domestic hot water.

SUMMARY OF THE INVENTION

In accordance with the illustrative embodiments demonstrating features and advantages of the present invention, there is provided a controller for a room heating system. This system employes a controller for a combination room heating and water heating system which enables the disabling of the water heating without eliminating room heating which combination system comprise a furnace, a room thermostat for firing the furnace to provide room heating and a furnace thermostat for firing the furnace to provide water heating, where said controller utilizes said room thermostat for independently firing said furnace to provide room heating to a selected temperature and which utilizes said furnace thermostat to operatively connect with a timed switch to regulate the heating of water during selected time periods.

By employing the foregoing equipment a relatively simple timing system is provided for saving energy and fuel. Effectively the portion of the furnace ordinarily requiring cycling of the furnace merely to provide potable hot water is disabled by a timing device. However, the room thermostat can override the timing device so that the furnace can provide space heating as demanded by the room thermostat.

In a preferred embodiment, a relay having high voltage and low voltage contacts is controlled by a relay coil driven by a room thermostat. The room thermostat carries a low voltage supplied preferably by a low voltage transformer. The low voltage relay contacts are connected to the furnace in the same manner as would be the room thermostat to operate the burner and if applicable, the circulator associated with the furnace. The high voltage relay contacts can connect and disconnect power from the furnace. A timer may be employed herein to restore power to the furnace on a schedule consistent with the needs of an occupant.

The type of timer employed herein can preferably divide the day into two or more intervals and can be easily reset to change the time schedule according to the needs of the occupant. Preferably, the contacts of the timer are connected in parallel with a remote switch conveniently accessible to an occupant wishing to override the timer and obtain hot water.

BRIEF DESCRIPTION OF THE DRAWINGS

A brief description as well as other objects, features, and advantages of the present invention will be more fully appreciated by reference to the following detailed description of presently preferred but nonetheless illustrative embodiments in accordance with the present invention which are taken in conjunction with the accompanying drawings wherein:

FIG. 1 is a schematic diagram of a controller according to the present invention;

FIG. 2 is a schematic diagram of a heating system employing the controller of FIG. 1; and FIG. 3 is a schematic diagram of a heating system employing the controller of FIG. 1.

DETAILED DESCRIPTION OF THE PREFERRED EMBODIMENTS

Referring to FIG. 1, a controller 10 is shown enclosed by broken lines. A switching means 12 is shown herein comprising relay coil 14 which can when energized close two pairs of switched terminals shown here as normally open contacts 16 and 18. Contacts 18 connect to output terminals T1 and T2.

A timed switch is shown herein as timing device 20, driving a pair of contacts 22. Contacts 22 are connected in parallel with contacts 16. Also, connected in parallel with contacts 16 is manually operable switch 24, a local switch actuated by an occupant when he wishes to eliminate the influence of timed switch 20 and obtain hot water continuously. Switch 24, normally located at controller 10, can be located anywhere between the power input lines and a furnace. For convenience, a manually operable switch 26 is connected in parallel with switch 24 but located at a remote location conveniently accessible to an occupant wishing to disable timer 20.

Room thermostat 28 is shown connected in circuit with the secondary of transformer T1 and relay coil 14. The primary of transformer T1 is connected between power input terminal P1 and, through fuse F1, to power input terminal P2. Similarly connected to terminals P1 and P2 is timer 20. Power input terminal P1 is connected to output terminal L1. Input terminal P2 is connected through fuse F1, to one terminal of switch 24, its other terminal being connected to output terminal L2.

Referring to FIG. 2, a heating system is shown as furnace 32. Furnace 32 is in this embodiment a hot water type of plant, which includes a hot water circulator 34 and a burner 36, each controlled through a pair of lines by primary control 38. Control 38 includes a furnace thermostat (aquastat) to fire burner 36 if the internal temperature of furnace 32 falls below a magnitude sufficient to supply potable hot water. Controller 10, previously illustrated in FIG. 1, is connected by its terminals T1 and T2 to a thermostatic input of control 38. Control 38 will energize circulator 34 and burner 36 if a closed circuit occurs across terminals T1 and T2, provided power is being supplied to control 38 from terminals L1 and L2 of controller 10. Serially connected between terminal L2 of controller 10 and controller 38 is a conventional emergency switch 42 for shutting off the furnace. Room thermostat 28 is shown connected by a pair of lines to optional zones valves 40 which operate conventionally. A pair of lines from zone valves 40 connect to controller 10 and apply a short circuit thereto when room thermostat 28 operates.

Referring to FIG. 3, an alternate embodiment is shown employing a furnace 44 having control 46 driving burner 48 through a pair of control lines. Primary power is provided to control 46 from the output terminal L1 and, through emergency switch 42, output terminal L2 of controller 10, previously illustrated in FIG. 1. Burner control 46 also has a pair of thermostatic input lines from terminals T1 and T2 of controller 10. Connected in parallel across terminals T1 and T2 is a furnace thermostat, shown herein as aquastat 50. In this arrangement aquastat 50 operates as a supplemental thermostat and can fire burner 48 in the same manner as room thermostat 28. The balance of the components illustrated in this figure are the same as shown in FIG. 2 except that no zone valves are employed.

To facilitate an understanding of the principles associated with the foregoing apparatus, the operation of the system of FIGS. 1 and 3 will be briefly described. It will be appreciated that the operation of the system of FIG. 2 is substantially the same except that a different type of furnace is being controlled. It will also be assumed that the state of timer 20 (FIG. 1) is such that switch 22 is closed to provide power from input terminal P2 through fuse F1 to output line L2. Thus lines L1 and L2 convey at this time primary power. It will also be assumed that emergency switch 42 of FIG. 3 is closed so that power is conveyed from lines L1 and L2 to control 46 of furnace 44. As temperature of its room falls, room thermostat 28 closes, connecting the secondary of transformer T1 across relay coil 14 (FIG. 1). In response, contacts 18 (FIG. 1) close, providing a short circuit across terminals T1 and T2. This short circuit across terminals T1 and T2 is conveyed to burner control 46 (FIG. 3) causing it to fire burner 48 to provide space geating. It will be appreciated that aquastat 50 being connected in parallel with terminals T1 and T2, can also fire burner 48 but does so solely to keep the internal temperature of furnace 44 sufficiently high to supply potable hot water. When room temperature rises room thermostat 28 again opens to restore initial conditions and shut off burner 48.

Eventually timed switch 22 (FIG. 1) opens. It will be assumed that manually operable switches 24 and 26 are also open at this time. Consequently, there is no longer a direct connection from terminal P2 to terminal L2 as contacts 16, 22, 24 and 26 are all open. Therefore, power is removed from burner control 46 and, necessarily, burner 48 (FIG. 3). As a result, aquastat 50 is unable to fire burner 48 since no power is available. Thus energy is saved since furnace 44 does not cycle during an unscheduled interval when hot water is not required. It will now be assumed that room thermostat 28 closes as its room temperature descends thereby connecting the secondary of transformer T1 across relay coil 14 (FIG. 1). Consequently, contacts 16 close and restore the power connection from terminal P2 to output terminal L2 thereby powering burner control 46. Also, at this time contacts 18 (FIG. 1) closed to provide a short circuit across terminals T1 and T2. Consequently, the thermostatic input of burner control 46 (FIG. 3) connected to terminals T1 and T2 are shorted to cause the firing of burner 48.

Summarizing, it will be appreciated that timed switch 20 can divide the operation of furnace 44 (FIG. 3) into two operational modes. In one mode, only room thermostat 28 can cause the firing of furnace 44. This mode might be appropriate during sleeping hours when potable hot water is not required. In the second mode both room thermostat 28 and furnace thermostat 50 can fire furnace 44. This mode might be appropriate during selected waking hours when potable hot water is required.

Timed switch 20 can be overridden by manually operable switches 24 and 26 so that room thermostat 28 and furnace thermostat 50 (FIG. 3) are both influential. This feature is useful whenever an occupant may require hot water during unscheduled time intervals.

It is to be appreciated that various modifications may be implemented with respect to the above described preferred embodiments. For example, the previously illustrated switching devices may be replaced with various switching devices such as semiconductor or electromechanical switches. Also, various components such as the low voltage transformer may be eliminated depending upon the chosen operating potential. It will also be appreciated that various types of furnaces can be controlled. Furthermore, other timed switches can be employed which may divide a day into two or more time zones. In addition numerous components may be substituted for those illustrated depending upon the number and type of furnaces, room thermostats, aquastats and depending upon the desired speed, power handling capacity, etc.

Obviously, many modifications and variations of the present invention are possible in light of the above teachings. It is therefore to be understood that within the scope of the appended claims, the invention may be practiced otherwise than as specifically described.

What is claimed is:

1. A controller for a combination room heating and water heating system which enables the disabling of the water heating without eliminating room heating which combination system comprise a furnace, a room thermostat for firing the furnace to provide room heating and a furnace thermostat for firing the furnace to provide water heating, where said controller utilizes said room thermostat for independently firing said furnace to provide room heating to a selected temperature and which utilizes said furnace thermostat to operatively connect with a timed switch to regulate the heating of water during selected time periods said controller comprising:

a power input terminal for receiving primary electrical power;

a timed switch for connecting and disconnecting said power input terminal to said furnace, disconnecting said terminal disabling said furnace thermostat; and switching means responsive to said room thermostat for connecting and disconnecting said power input terminal to said furnace.

2. A controller according to claim 1 wherein said furnace has a thermostatic input and wherein said switching means comprises:

two pairs of switched terminals, one of said pairs being connected to said thermostatic input, the other pair being connected in parallel with said timed switch.

3. A controller according to claim 2 wherein said switching means comprises:

a transformer having a secondary serially connected with said room thermostat and having a primary connected to said power input terminal.

4. A controller according to claim 3 comprising:

a manually operable switch connected in parallel with said timed switch.

5. A controller according to claim 4 wherein said switching means comprises:

a relay coil serially connected with said room thermostat for switching said two pairs of switched terminals.

6. A controller according to claim 5 wherein said timed switch comprises:

a timing device having a power line connected to said power input terminal; and a pair of contacts connected in parallel with said switching means and operated by said timing device.

7. A controller for a combination room heating and water heating system which enables the disabling of the water heating without eliminating room heating which combination system comprise a furnace, a room thermostat for firing the furnace to provide room heating and a furnace thermostat for firing the furnace to provide water heating, where said controller utilizes said room thermostat for independently firing said furnace to provide room heating to a selected temperature and which utilizes said furnace thermostat to operatively connect with a timed switch to regulate the heating of water during selected time periods said controller comprising:

a power input terminal for receiving primary electrical power;

a transformer having a secondary serially connected with said room thermostat and having a primary connected to said power input terminal;

a timing device having a power line connected to said power input terminal;

a pair of timed contacts operated by said timing device;

two pairs of switched terminals, one of said pairs being connected to said thermostatic input, the other pair being connected in parallel with said timed contacts;

a relay coil serially connected with said room thermostat for switching said two pairs of switched terminals; and a manually operable switch connected in parallel with said timed contacts.

* * * * *